(No Model.)
W. F. MODES & A. J. UGEL.
GLASS TANK FURNACE.
No. 563,293. Patented July 7, 1896.
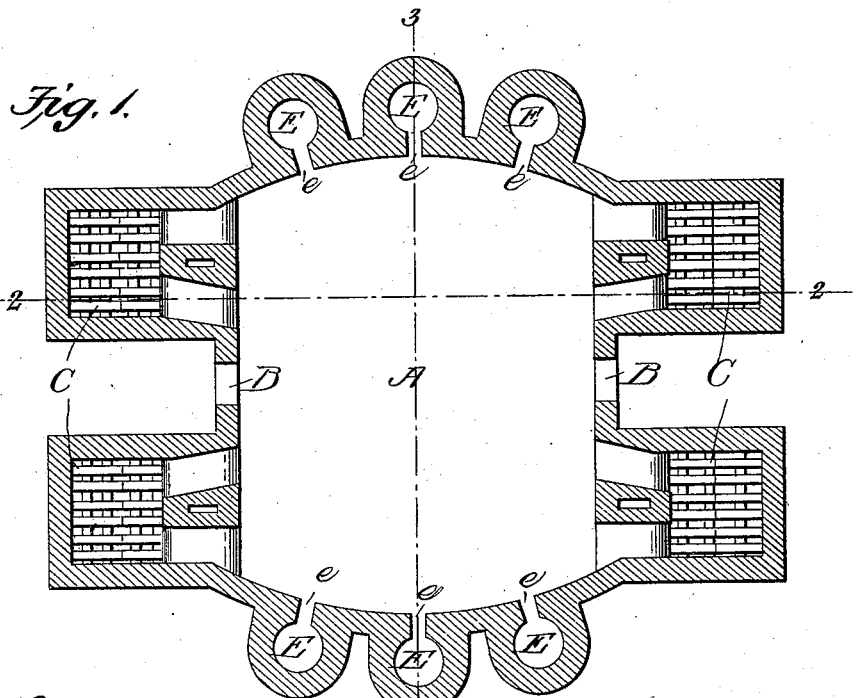
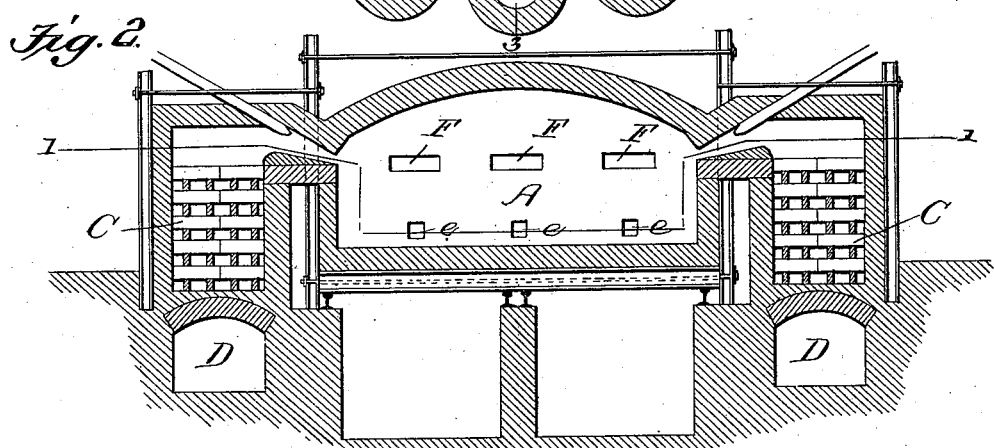
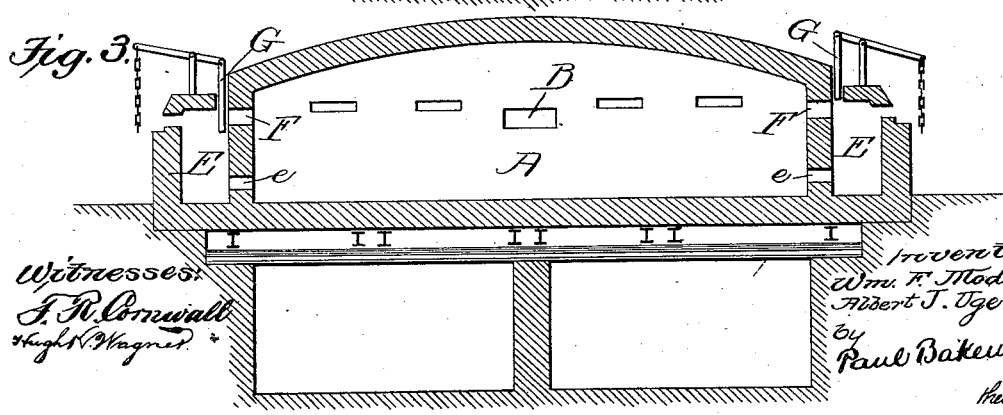

UNITED STATES PATENT OFFICE.

WILLIAM F. MODES AND ALBERT J. UGEL, OF CICERO, INDIANA.

GLASS-TANK FURNACE.

SPECIFICATION forming part of Letters Patent No. 563,293, dated July 7, 1896.

Application filed September 30, 1895. Serial No. 564,121. (No model.)

*To all whom it may concern:*

Be it known that we, WILLIAM F. MODES and ALBERT J. UGEL, citizens of the United States, and residents of Cicero, in the county of Hamilton, State of Indiana, have invented a certain new and useful Improvement in Glass-Tank Furnaces, of which the following is a full, clear, and exact description, reference being had to the accompanying drawings, forming a part of this specification, wherein—

Figure 1 is a horizontal sectional view on line 1 1, Fig. 2. Fig. 2 is a longitudinal sectional view on line 2 2, Fig. 1. Fig. 3 is a cross-sectional view on line 3 3, Fig. 1.

This invention relates to a new and useful improvement in glass-tank furnaces, the object being to make a furnace of the class described in which the molten glass runs into suitable receptacles or wells, arranged without the lines of the furnace proper, said wells having suitable means for controlling the temperature of the glass in each separate and individual well, said means being operative in each well independently of the others.

With this object in view the invention consists in construction, arrangement, and combination of the several parts, all as will hereinafter be described, and afterward pointed out in the claims.

The furnace shown in the accompanying drawings is adapted to use a liquid or gaseous fuel, but it will be understood that the heat-generating medium is immaterial.

Referring to the drawings, A indicates the furnace proper, in which the material is melted. This tank is charged at its ends through suitable openings B, located above the glass-line. The regenerators C are preferably arranged at the ends and on each side of the charging-openings, forming between them a passage-way to said openings. D indicates the flues, which are constructed in the usual manner and are provided with damper-plates, as is customary in regenerative furnaces.

The body of the tank is supported by suitable beams and bridge-walls, as is usual.

Arranged at the sides of the tank, and preferably outside of the side lines proper of the tank, are wells E, into which the molten glass flows through openings $e$, arranged near the bottom of the tank. By arranging these communicating openings $e$ near the bottom of the tank we are enabled to secure glass in the wells in the best condition for manipulation. That is, at the bottom of the tank or at the top the material of which the glass is composed is not thoroughly fused, and glass taken from such points will be seedy or cordy.

In order to maintain the proper temperature of the glass in the wells, we arrange communicating openings F between the tank and wells above the glass-line, through which openings the heat from the tank is radiated and tends to maintain the temperature of the glass in the wells to that of the glass in the tank proper. This high temperature, however, is objectionable in some instances, such, for instance, as where the glass is to be blown, and to reduce the temperature of the glass in the wells, which makes it of thicker consistency, we arrange controlling-dampers G at some convenient point, which dampers control the passage of heat from the tank to the wells. These dampers, as shown in the drawings, are gravity-dampers, and are raised and lowered by a suitable lever and chain, but it is obvious that other forms of dampers, such as sliding dampers and hinge-dampers, could as well be employed, and would answer the same purpose.

The advantages of a tank-furnace, such as shown in the drawings, are many. Among these may be mentioned the operator's control of each individual well, whereby glass of different consistency may be taken from the same tank, but different wells. The glass which flows into the wells is in the very best condition, being taken midway the height of the tank, and occupies the same level as the glass within the tank. By the presence of the dampers the dust from the charging-batch may be readily excluded from the wells, thus preventing a fruitful cause of contamination of the working glass. If desired, means may be provided for closing the working openings in the wells, whereby the temperature of the glass contained therein would be more fully under control.

Having thus described our invention, what we claim, and desire to secure by Letters Patent, is—

1. The combination with a glass-tank melting-furnace, of wells arranged at the side thereof and beyond the line of said furnace, communicating openings between the wells and tank located below the glass-line and above the bottom of the tank, communicating openings between the tank and wells above the glass-line, and suitable dampers for controlling said last-named openings; substantially as described.

2. The combination with a glass-tank melting-furnace, having regenerators and charging-doors at its ends, of wells located at the side of the tank and communicating therewith below the glass-line, communicating openings between the tank and wells above the glass-line, and suitable dampers for controlling said last-named openings, substantially as described.

3. The combination with a glass-tank melting-furnace, having regenerators and charging-doors at its ends, of wells arranged at the sides of said tank and communicating therewith, below the glass-line and above the bottom of the tank, separate communications between the tank and the individual wells, above the glass-line, and controlling-dampers for said last-named communications, substantially as described.

In testimony whereof we hereunto affix our signatures, in presence of two witnesses, this 28th day of August, 1895.

WILLIAM F. MODES.
ALBERT J. UGEL.

Witnesses:
 EDWARD C. MODES,
 F. E. SCOTT.